No. 864,769. PATENTED SEPT. 3, 1907.
E. P. BREWER.
OPHTHALMOMETER.
APPLICATION FILED AUG. 29, 1904. RENEWED DEC. 22, 1906.
3 SHEETS—SHEET 1.
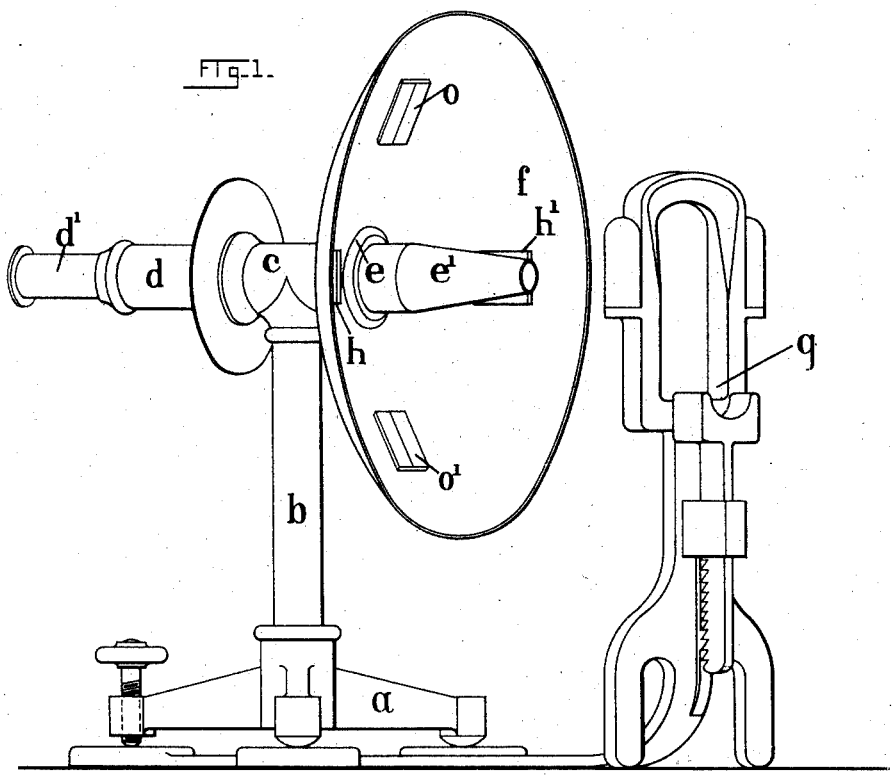
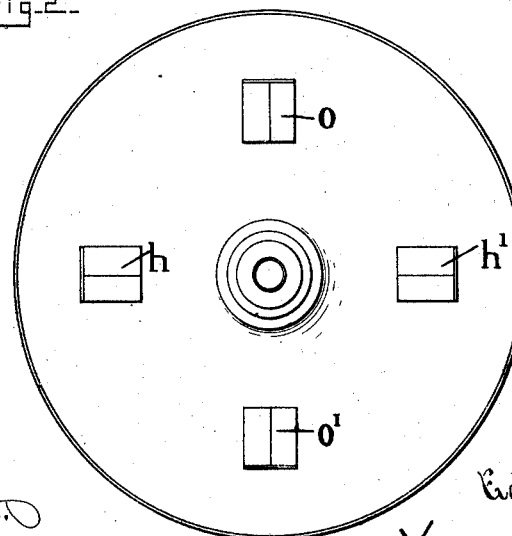
WITNESSES
INVENTOR
Edward P. Brewer,
BY
Frank H. Allen
ATTORNEY.

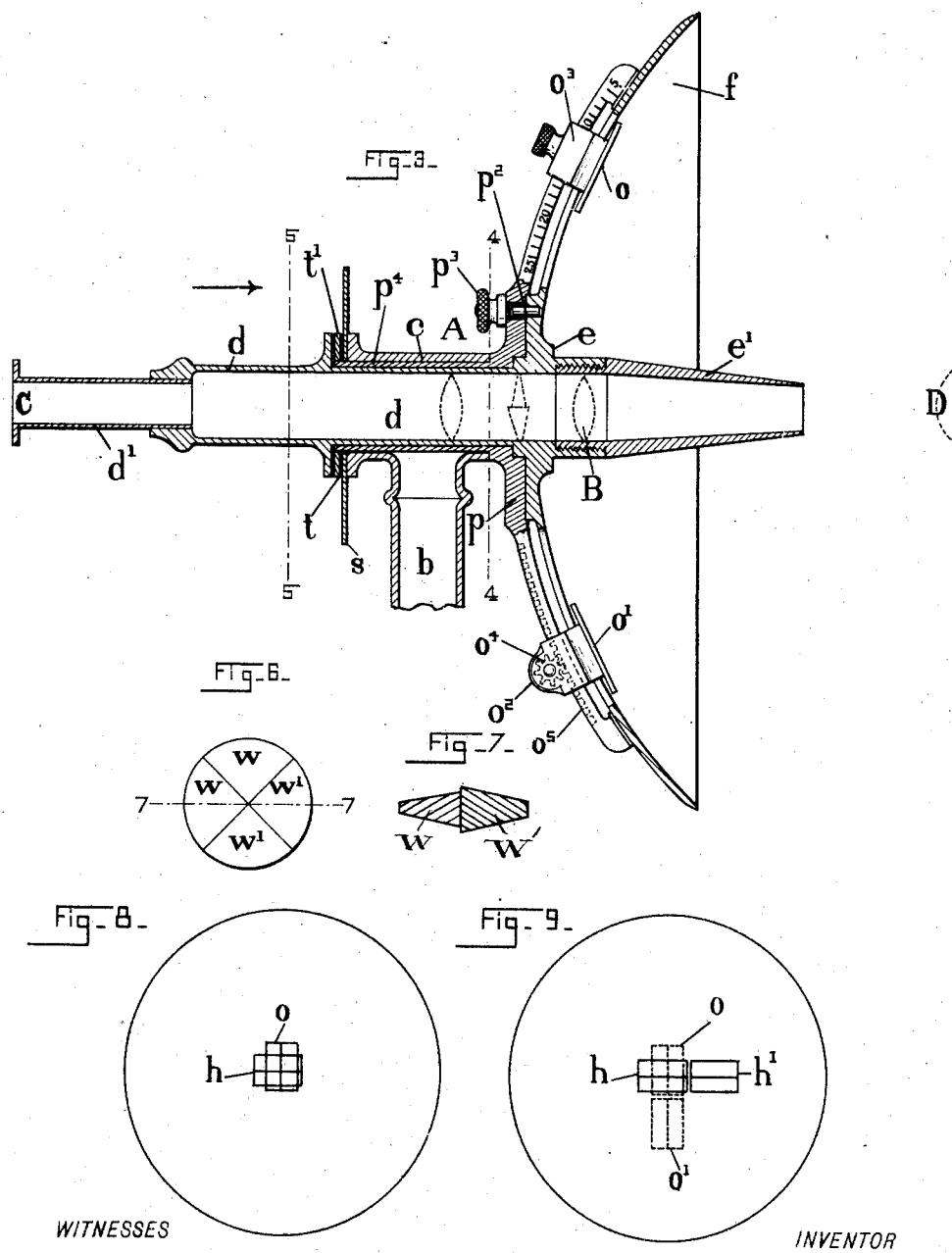

No. 864,769. PATENTED SEPT. 3, 1907.
E. P. BREWER.
OPHTHALMOMETER.
APPLICATION FILED AUG. 29, 1904. RENEWED DEC. 22, 1906.
3 SHEETS—SHEET 3.
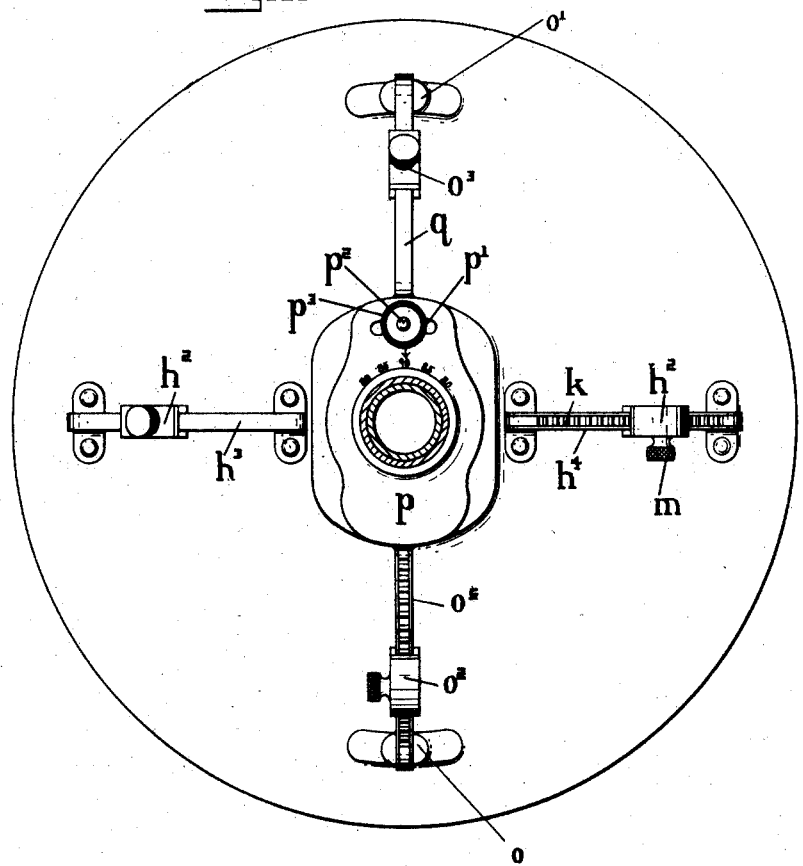
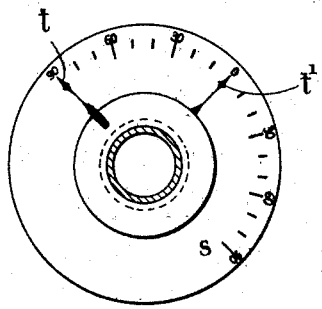
WITNESSES
INVENTOR
Edward P. Brewer.
BY
Frank H. Allen
ATTORNEY

UNITED STATES PATENT OFFICE.

EDWARD P. BREWER, OF NORWICH, CONNECTICUT.

OPHTHALMOMETER.

No. 864,769.   Specification of Letters Patent.   Patented Sept. 3, 1907.

Application filed August 29, 1904, Serial No. 222,655. Renewed December 22, 1906. Serial No. 349,163.

*To all whom it may concern:*

Be it known that I, EDWARD P. BREWER, a citizen of the United States, residing at Norwich, in the county of New London and State of Connecticut, have invented certain new and useful Improvements in Ophthalmometers, of which the following is a full, clear, and exact description.

The immediate object of this invention is to improve the so called "Javal" ophthalmometer, to the end that greater accuracy of measurement, and speed of operation, may be readily attained.

The instrument to which my improvements relate is provided for measuring the curve of the corneal surfaces of the eye or, in other words, the radii of the cornea. Heretofore it has been the common practice to take measurements in different planes and compare the deductions; one measurement being used to verify the other, or to show the variations of the corneal curves in the different planes, as the case may be. These instruments as now constructed provide for taking the measurement in a single plane only, and, after the initial measurement has been made, the apparatus is partly rotated to make the second measurement but, in thus adjusting the apparatus, the initial record is destroyed and, if the eye which is being tested be displaced or moved never so slightly, the comparative test (that is to say the comparison of the second test with the first) is of uncertain value.

My present purpose is to provide simple apparatus by means of which measurements in two different planes may be made simultaneously, the operator of the instrument having the records of such double test before his vision at the same time.

My invention is illustrated in the annexed three sheets of drawings, Figure 1 being a perspective view of an ophthalmometer embodying my improvements. Fig. 2 is a view of the cupped face of the revoluble disk that carries the so called "targets." Fig. 3 is a longitudinal, central sectional view of the said disk, the eye-piece and lens-supporting tube, all being somewhat enlarged; this view showing particularly the mechanical means provided for adjusting the targets, and Fig. 4 is a view of the outer or convex face of the disk, said view being taken on line 4 of the Fig. 3. Fig. 5 is a cross-sectional view of the lens-tube taken on line 5—5 of Fig. 3, looking in the direction of the arrow, and showing also a disk (*s*) on which is indicated the meridian that is being measured by targets $h$—$h'$ and $o$—$o'$. In Fig. 6 I have shown a face or front view of the compound prismatic lens by means of which the reflections of the targets on the cornea are viewed by the oculist. Fig. 7 is a sectional view taken on the horizontal line 7—7 of said Fig. 6. Fig. 8 illustrates the positions assumed by the reflected targets on the cornea of a normal eye at the beginning of a test, and Fig. 9 is a diagram illustrating, in full lines, the image reflected upon the observed eye at the completion of the test.

The ophthalmometer here illustrated may be briefly described as follows:—A broad base $a$ is provided on which is mounted an upright or standard $b$ which latter supports a tube $c$ within which is revolubly mounted a tube $d$ one of whose ends ($d'$) forms an extensible eye-piece. Secured to the opposite end of tube $d$ is a collar $e$ upon which is formed the cupped disk $f$ that carries the targets, as I shall explain later on. Secured to the free end of the collar $e$ is a tube $e'$. The tube $d$, collar $e$, tube $e'$ and disk $f$ are practically a single structure and as such may be revolved freely within the fixed tube $c$. Adjacent to the free end of the extended tube $e'$ is a head-rest $g$ of the usual type, the location of the said rest, relatively to the said tube $e'$, being such that, when the head of the patient is supported therein, one eye is coincident with the said tube and may be viewed by the oculist through the described eye-piece $d'$.

The elements, and the arrangement of the same, thus far described are substantially the same as in ophthalmometers as now constructed.

Mounted in the front face of disk $f$ are oppositely-disposed targets $h$—$h'$ that are so supported that they may be independently adjusted toward or away from each other, the adjusting mechanism being best seen in Figs. 3 and 4 of the drawings. Each target is mounted on, and carried by, a plate that extends through a slot in the disk $f$, which plate is supported by a rectangular frame $h^2$ provided with an opening that serves as a housing and guide for a rib secured to the rear face of disk $f$. The rib that coöperates with the opening in the housing that carries the target $h'$, as just explained, is indicated by the letter $h^3$ and serves simply as a support and guide for the said target $h'$, but the rib ($h^4$) that operates with the housing of the target $h$ serves not only as a guide for said housing but is also formed with rack-teeth $k$ that are engaged by a pinion gear pivoted in said housing as seen in dotted lines in Fig. 4. The pivot that supports the said pinion extends outward through the housing and has secured thereon a milled thumb-piece $m$ by means of which the pinion may be readily rotated when it is desired to adjust the target.

Arranged at right angles to the targets $h$—$h'$ are similar targets $o$—$o'$ carried by housings $o^2$—$o^3$ in the former of which is pivoted a pinion gear $o^4$ that meshes with a rack $o^5$. The inner end of rack $o^5$ is secured to a plate $p$ that is revolubly mounted on the tube $d$, in such manner that the rack and the connected target $o$ may be swung laterally a limited distance to change the angle of said target relatively to the horizontal targets $h$—$h'$ and, in order to secure the target in desired position after adjustment, I have slotted the said plate as at $p'$ and have provided in said slot a threaded stud $p^2$ and check-nut $p^3$, as seen in Figs. 3 and 4.

The target $o'$ is diametrically opposite to the target $o$, and is carried by a housing $o^3$ that is mounted to slide on a rib or bar $q$ which is also secured to the plate $p$, as is best seen in Fig. 4, and it will now be understood that, when the said plate $p$ is rocked on the tube $d$ the targets $o$—$o'$ will be correspondingly moved, thus changing the positions of the said targets $o$—$o'$ relatively to the targets $h$—$h'$. The arm $q$ is provided with a graduated scale, as seen in Fig. 3, to indicate the relative difference in diopters of focus between the positions of targets $h'$ and $o'$.

Referring now to Figs. 1, 3 and 5, the letter $s$ denotes a disk that is secured to the fixed collar $c$ within which the tube $d$ rotates and, secured to the said tube $d$, is an index or pointer $t$. A similar index $t'$ is secured to the end of a sleeve $p^1$ extending rearward from plate $p$, the two described indexes being arranged normally at right angles to each other. So long as the plate $p$ and the disk $f$ are secured together the said indexes preserve the same relation to each other, but whenever the plate is rocked to change the positions of targets $o$—$o'$ relatively to the horizontal targets $h$—$h'$, the relative positions of the indexes are correspondingly changed, the degree or extent of such change being indicated on a graduated scale $s'$ on the rear face of the disk $s$.

Having now described the mechanical construction of my improved ophthalmometer, I will proceed to describe the peculiar form and arrangement of certain prismatic lenses by means of which images of the several targets which are reflected from the cornea of the observed eye, are focused upon the eye of the oculist.

Within the telescopic tube $d$ is a compound objective consisting of two double convex lenses A, B, between which lenses is a refracting prism consisting of two pairs of oppositely-disposed quadrantal-shaped prisms $w$—$w'$ of unequal strengths (see Figs. 6 and 7). The eye to be measured is placed at D, the principal focus of the lens B. At C (the principal focus of the lens A) there is formed an inverted image of the same size as the erect image formed by reflection on the cornea. The disk $s$ and co-acting index $t'$ already described, are provided to register, or rather indicate, upon the graduated fixed disk the angle through which the telescope and connected disk $f$ are rotated, and the combined indices $t$—$t'$ provide a means for accurately and quickly determining any departure from a right angle that may occur between the horizontal targets $h$—$h'$ and the vertical targets $o$—$o'$.

The targets $h$ and $o$ are set in corresponding positions relatively to the center of the disk $f$ before beginning a test and they may therefore be designated as "fixed" targets. These fixed targets are so located that their reflections overlap each other, to some extent, as seen in Fig. 8, and in a normal eye the longer sides of the reflection of target $h$, when thus adjusted, should be in alinement with the sides of the target $o$, or projecting beyond said sides.

In practice it is customary to first test the curvature of the cornea in the horizontal meridian for the reason that that curvature is ordinarily less than in the vertical meridian. In thus testing the horizontal curvature the targets $h$—$h'$ are utilized the former being "fixed" and the latter being adjusted until its side lines register with the corresponding lines of the target $h$. Having thus obtained, for the time being, a record of the horizontal curvature, which, in fact, serves as a point of departure when about to measure the vertical curvature, the operator next adjusts the target $o$ until its side lines register with the corresponding sides of the target $o'$. The images of the several targets will then have assumed the positions shown in Fig. 9, the reflections of targets $h$—$h'$ being given in full lines and the reflections of targets $o$—$o'$ being indicated by dotted lines in the said figure in order to avoid confusion. Thus four images are simultaneously seen reflected on the cornea of the observed eye in ascertaining the difference, if there be a difference, between the horizontal and vertical measurements of the corneal surface and said difference may be readily read on the graduated disk $s$.

Obviously my described means of simultaneous double measurement produces results more nearly correct than can be obtained by the present known means in which the record of the horizontal measurement is destroyed before the vertical measurement is taken, the accuracy of such separate measurements being impaired by never so slight a movement and displacement of the viewed eye after the first measurement is taken. By my present improved apparatus the records of both the horizontal and vertical measurements are before the eye of the operator at the same time, for comparison, and they may be read or computed at his leisure.

Having thus described my invention, I claim:—

1. The combination with means for viewing the eye by reflection, of pairs of oppositely disposed targets, the targets of one pair lying in a plane at an angle to that of the other pair.

2. In combination, in an ophthalmometer, oppositely disposed targets, supplemental targets slidable in a direction at right angles to the plane common to the said oppositely disposed targets, and means for adjusting the supplemental targets to vary their respective inclinations relatively to the companion targets.

3. In combination, in an ophthalmometer, two oppositely-disposed targets, means for adjusting said targets relatively to each other, supplemental targets adjustable in planes at right angles to the plane common to the said two oppositely-disposed targets, means for varying the inclination of the supplemental targets relatively to the companion targets, and for indicating the said inclination.

4. In combination, in an ophthalmometer, a revoluble tube containing a prismatic lens for viewing the eye by reflection, a disk mounted on the said tube, oppositely-disposed targets adjustably mounted on said disk, supplemental targets located midway the said oppositely-disposed targets and means for varying and for indicating the inclination of the said supplemental targets relatively to the companion targets.

5. In combination, with an ophthalmometer, a double refracting lens composed of two pairs of triangular prisms of unequal refraction, substantially as herein set forth.

In testimony whereof I have signed my name to this specification in the presence of two subscribing witnesses.

EDWARD P. BREWER.

Witnesses:
FRANK H. ALLEN,
MAY F. RITCHIE.